(12) United States Patent
Zinn

(10) Patent No.: US 7,224,727 B2
(45) Date of Patent: May 29, 2007

(54) APPARATUS AND METHOD FOR ENCODING SIGNALS

(75) Inventor: Raymond D. Zinn, Atherton, CA (US)

(73) Assignee: Micrel, Incorporated, San Jose, CA (US)

( * ) Notice: Subject to any disclaimer, the term of this patent is extended or adjusted under 35 U.S.C. 154(b) by 727 days.

(21) Appl. No.: 09/967,807

(22) Filed: Sep. 28, 2001

(65) Prior Publication Data

US 2003/0064684 A1    Apr. 3, 2003

(51) Int. Cl.
*H03K 7/08* (2006.01)
(52) U.S. Cl. ...................... 375/238; 332/111
(58) Field of Classification Search .............. 375/238; 370/205; 329/312; 332/109, 111
See application file for complete search history.

(56) References Cited

U.S. PATENT DOCUMENTS 5,132,560 A * 7/1992 Kane ........................ 327/65
5,134,632 A * 7/1992 Fletcher et al. ............ 375/238
5,457,489 A * 10/1995 Yamamoto et al. ......... 347/247
6,169,765 B1 * 1/2001 Holcombe .................. 375/238
6,232,796 B1 * 5/2001 Batra et al. .................. 326/93

\* cited by examiner

*Primary Examiner*—Kevin Kim
(74) *Attorney, Agent, or Firm*—Dorsey & Whitney LLP

(57) ABSTRACT

The present invention provides an apparatus and method for encoding and/or decoding signals. The encoding apparatus includes a variable impedance being coupled with an encoder. The variable impedance establishes a select voltage at the encoder. The encoder is further coupled with an input signal, wherein the encoder generates a modulated output as dictated by the select voltage. The decoding apparatus includes an integrator, a comparator and at least a first variable impedance. The integrator couples with the comparator, and is configured to receive an encoded signal and to generate an average DC voltage, such that the comparator receives the average DC voltage. The first variable impedance coupled with the comparator, and dictates a first limit such that the comparator receives the first limit. The comparator is configured to generate a decoded signal if the average DC voltage is at least equal to the first limit.

12 Claims, 5 Drawing Sheets

APPARATUS AND METHOD FOR ENCODING SIGNALS

TECHNICAL FIELD

This invention pertains to an encoding and decoding method and apparatus, and more particularly to a method and apparatus for encoding and decoding dictated by one or more variable impedance networks.

BACKGROUND

Data or signals are often encoded prior to transmission of the signal to provide additional security. Once received, only a receiver configured to decode the encoded signal or data is capable of decoding the encoded signal.

For example, remote control through wireless communication, such as radio frequency or infrared, is well known for communication of signals, including activating and deactivating car alarms and building alarms, and signaling automatic garage door openers.

However, encoders and decoders are implemented through complicated circuit designs, and thus add to the cost to implement. Further, encoders and/or decoders implemented on integrated circuit requires additional complexity.

SUMMARY

The present invention provides an apparatus and method for encoding and/or decoding signals. The encoding apparatus includes a variable impedance being coupled with an encoder. The variable impedance establishes a select voltage at the encoder. The encoder is further coupled with an input signal, wherein the encoder generates a modulated output as dictated by the select voltage. The decoding apparatus includes an integrator, a comparator and at least a first variable impedance. The integrator couples with the comparator, and is configured to receive an encoded signal and to generate an average DC voltage, such that the comparator receives the average DC voltage. The first variable impedance is coupled with the comparator, and dictates a first limit such that the comparator receives the first limit. The comparator is configured to generate a decoded signal if the average DC voltage is at least equal to the first limit.

The encoder modulates the input signal as dictated by the select voltage. The encoder includes a comparator, such that the select voltage couples with a first input of the comparator and the input signal couples with a second input of the comparator. In one embodiment, a capacitance is coupled with the variable impedance such that the select voltage is defined between the variable impedance and the capacitance and the input signal is a trip voltage wherein the encoder generates the modulated output at a first voltage level when the select voltage is less than the trip voltage and at a second voltage level when the select voltage is equal to or greater than the trip voltage.

In one embodiment, the decoder further includes a second variable impedance coupled with the comparator, wherein the second variable impedance dictates a second limit such that the comparator receives the second limit. The comparator is configured to generate the decoded signal if the average DC voltage is at least equal to or less than the first limit and at least equal to or greater than the second limit.

In one embodiment, the encoder is configured on an integrated circuit having at least a single pin, wherein the encoder couples with the single pin. The variable impedance is implemented off the integrated circuit such that the variable impedance couples with the single pin to supply the select voltage to the encoder through the single pin.

In one embodiment, the integrator and the comparator of the decoder apparatus are configured on an integrated circuit having at least a first pin. The first variable impedance is implemented off the integrated circuit, and couples with the first pin such that the first limit is supplied to the comparator through the first pin. The integrated circuit includes a second pin wherein the comparator couples with the second pint, and the second variable impedance is implemented off the integrated circuit, and couples with the second pin such that the second limit is supplied to the comparator through the second pin.

DETAILED DESCRIPTION

The present method and apparatus provides simplified encoding and decoding. In one embodiment, the apparatus and method utilizes an analog technique to encode and/or decode a predefined signature for actuator-based transceiver systems. A signal is encoded with the specific code or signature and is not decoded unless the specific code is verified. In one embodiment, the present apparatus and method provides for the ability to encode and/or decode signals with an encoder and/or decoder formed on an integrated circuit. The apparatus and method further provide the ability to modify an encoded signal external to the integrated circuit containing the encoder, and the ability to externally modify an decoder formed on an integrated circuit to allow decoding of the encoded signal. In one embodiment, the method and apparatus for external modification of an encoder and/or decoder is achieved through the use of an external resistance element and/or capacitance element.

Figure 1:
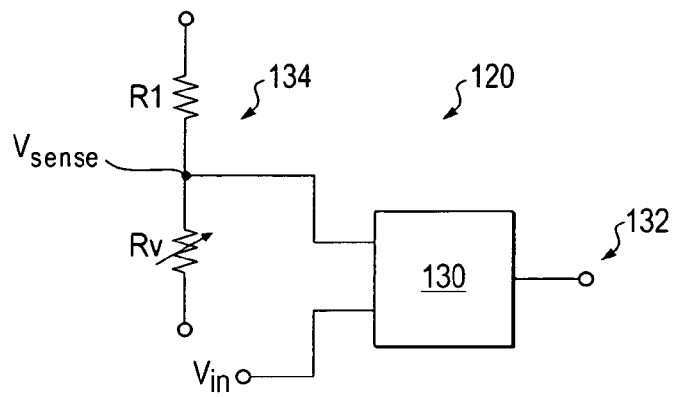
FIG. 1 depicts a simplified schematic diagram of one implementation of one embodiment of an apparatus of the present invention for encoding a reference or input signal.

FIG. 1 depicts a simplified schematic diagram of one implementation of one embodiment of an apparatus 120 of the present invention for encoding a reference or input signal Vin. An impedance network, such as a voltage divider 134, is established with a first resistance element R1 and a variable impedance element Rv to establish a threshold or sense voltage $V_{sense}$. By adjusting the impedance of the variable impedance element Rv, the sense voltage is adjusted. The sense voltage is applied to a first input of an encoder 130. The input signal Vin is applied to a second input of the encoder. By applying an input signal $V_{in}$ with a risetime which exceeds zero, such as a triangle wave signal, a sinusoidal signal and other such signals, the encoder 130 generates an output encoded by the select voltage $V_{select}$. In one embodiment, the encoder modulates the input signal Vin and generates a pulse width modulated (PWM), encoded output 132 having a specific signature or code defined by the select voltage $V_{select}$. In one embodiment, the encoded output 132 is maintained in a high state until the voltage of the input signal Vin becomes equal to or greater than the select voltage $V_{select}$, at which point the output 132 of the encoder 130 transitions to a low state. The duty cycle of the PWM output 132 is directly proportional to the select voltage $V_{select}$.

Figure 2A:
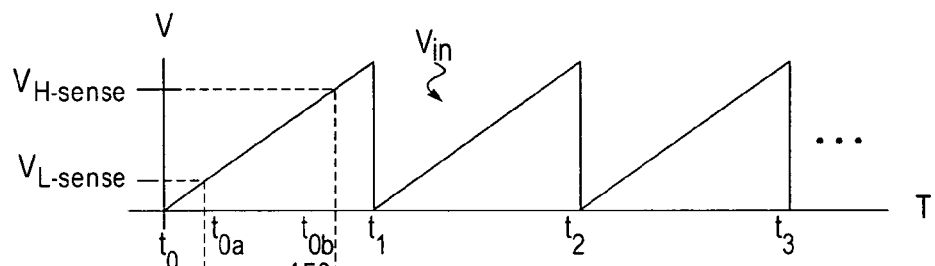
FIG. 2A depicts one example of a triangle wave input signal to the apparatus of FIG. 1.
Figure 2B:
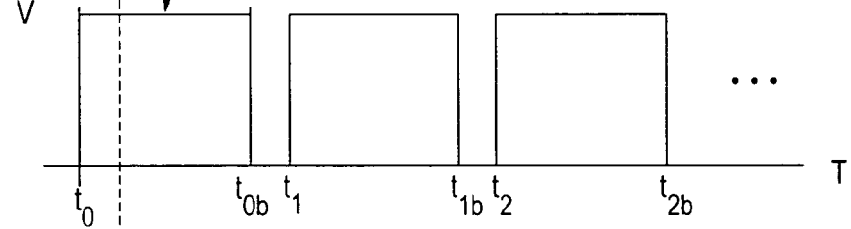
FIGS. 2B–C depict examples of a pulse width modulated (PWM) output generated by the apparatus of FIG. 1.
Figure 2C:
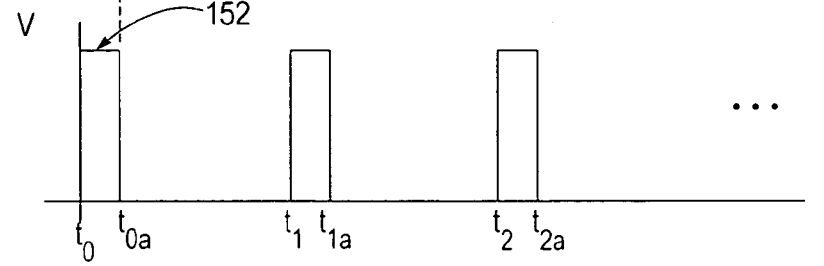

Referring to FIGS. 2A–C, for example, if the input signal Vin is a triangle wave 140, the encoder will generate a PWM output 132 with the specific code which is high until the voltage of the input signal Vin is equal to or greater than the sense voltage $V_{sense}$. Thus, by adjusting the variable impedance element Rv, the specific code of the encoded output 132 is varied such that the encoded output is in a high state for longer or shorter periods of time depending on the adjustments made to the variable impedance element. For example, if the variable impedance element Rv is set at a high impedance relative to the first resistance element R1, then the sense voltage is relatively high $V_{H\text{-}sense}$. Because the sense voltage is high $V_{H\text{-}sense}$, the encoded output 132 remains high 150 for a longer period of time ($t_{0b}$, $t_{1b}$, $t_{2b}$, ... ) because it takes longer for the voltage of the input signal Vin to equal the high sense voltage $V_{H\text{-}sense}$. Alternatively, if the variable impedance element is set to a small impedance relative to the first resistance element R1, then the sense voltage will be relatively low $V_{L\text{-}sense}$, compared to the sense voltage when the variable impedance element is large. Therefore, the encoded output 132 will be high 152 for a shorter period ($t_{0a}$, $t_{1a}$, $t_{2a}$, ... ) of time because the voltage of the input signal quickly equals the relatively low sense voltage $V_{L\text{-}sense}$.

Figure 3:
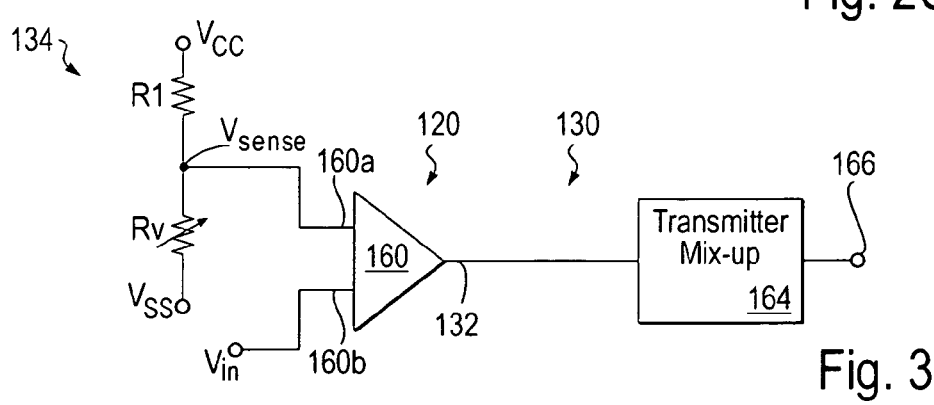
FIG. 3 shows a simplified schematic diagram of one implementation of another embodiment of the apparatus of the present invention for encoding a reference or input signal.

FIG. 3 shows a simplified schematic diagram of one implementation of one embodiment of the apparatus 120 of the present invention for encoding. A voltage divider 134 couples with an encoder 130, where the encoder includes at least a comparator 160. The first resistance element R1 of the divider 134 couples with a high reference voltage VCC and with a variable impedance element Rv. The variable impedance element further couples with a low reference voltage VSS establishing a sense voltage $V_{sense}$ between the first resistance element and the variable impedance element. The first resistance element R1 and the variable impedance element Rv further couple with a first input 160a of the comparator 160, such that the first input 160a receives the sense voltage $V_{sense}$. An input signal Vin couples with a second input 160b of the comparator, where the input signal has a risetime greater than zero. The comparator generates a modulated output 132 which is in a high state until the input voltage Vin is equal to or greater than the sense voltage $V_{sense}$. Thus, in one embodiment the modulated output 132 is a pulse width modulated output signal where the duty cycle of the PWM output is proportional to the select voltage $V_{select}$. For example, the higher the voltage level of the select voltage, the lower the duty cycle. In one embodiment, the comparator output 132 couples with a transmitter 164. The modulated output signal 132 is mixed-up by the transmitter 164 to a desired transmit frequency. The transmitter then transmits a transmit signal 166 to be received by a receiver described more fully below.

Figure 4:
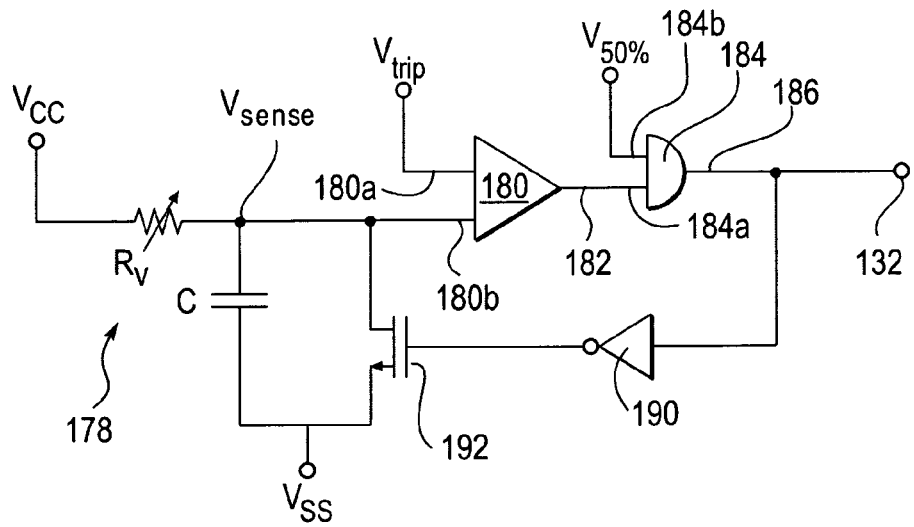
FIG. 4 shows a simplified schematic diagram of one implementation of a further embodiment of the apparatus of the present invention for encoding a reference or input signal.

FIG. 4 shows a simplified schematic diagram of one implementation of one embodiment of the encoding apparatus 120. In that embodiment, an RC time constant is utilized to generate a specific code of the encoded signal. By varying the RC product, the codes are made specific. A variable impedance element Rv couples to a first reference voltage VCC and to a capacitance element C. In one embodiment, the capacitance element C is a variable capacitance element. The capacitance element further couples with a second reference voltage VSS. A sense voltage $V_{sense}$ is established between the variable impedance element and the capacitance element. The variable impedance element Rv and capacitance element C couple with a first input 180a of a comparator 180 such that the first input 180a receives the sense voltage $V_{sense}$. An input signal couples with a second input 180b of the comparator 180. In one embodiment, the input signal is a trip or threshold voltage $V_{trip}$. The comparator output 182 couples with a first input 184a of an AND gate 184. A second input 184b of the AND gate couples with a periodic signal, such as a 50% duty cycle signal $V_{50}\%$. The output 186 of the AND gate provides the pulse width modulated signal 132 with the specific code defined by the RC time constant. The modulated signal 132 also couples with an inverter 190 and the inverter couples with a switch 192. In one embodiment, the switch 192 is implemented through an N-channel transistor where the AND gate couples with the gate of the transistor, the source of the transistor couples with the second reference voltage VSS and the drain of the transistor couples with the capacitance element C and thus the sense voltage.

When the apparatus 120 is activated, the voltage across the capacitance element C, and thus the sense voltage $V_{sense}$, will begin to ramp up at a rate defined by the RC constant of the variable impedance element Rv and the capacitance level of the capacitance element C. In one embodiment, the comparator will output a signal 182 in a first state, such as a high state, until the sense voltage $V_{sense}$ reaches a level at least equal to the trip voltage $V_{trip}$. Once the sense voltage equals the trip voltage, the comparator 180 will transition to generate the comparator output 182 in a second state, such as a low state. The comparator output 182 is forwarded to the AND gate 184 which generates the modulated output 132.

The modulated output 132 is forwarded to the inverter 190 which activates and deactivates the switch 192. When activated, the switch effectively couples the capacitance element C to the second reference voltage VSS causing a discharge of the capacitance element C and thus causing the sense voltage $V_{sense}$ to decrease towards the second reference voltage VSS. Once the sense voltage falls below the trip voltage $V_{trip}$, the comparator output 182 will transition back to the first state which causes a transition on the modulated output 132. The transition of the modulated output is received at the gate of the switch to shut off or deactivate the switch. Once the switch 192 is deactivated, the capacitance element is capable of again charging up at the rate defined by the RC constant until the sense voltage equals or exceeds the trip voltage $V_{trip}$. The activation of the switch 192, therefore, resets the encoding apparatus 120, and the deactivation of the switch allows the sense voltage $V_{sense}$ to again ramp up and approach the trip voltage. In varying the RC time constant, by varying the variable impedance element Rv or the capacitance level of the capacitance element C, a specific code modulation is achieved.

Figure 5:
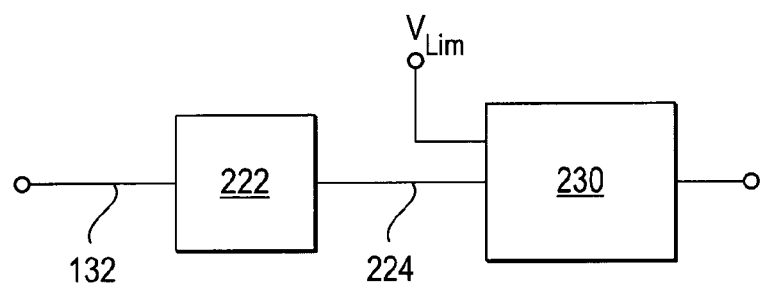
FIG. 5 depicts a simplified block diagram of one implementation of one embodiment of a decoding apparatus of the present invention.

FIG. 5 depicts a simplified block diagram of one implementation of one embodiment of a decoding apparatus 122 of the present invention. The decoding apparatus 122 is configured to receive the modulated signal 132 and to demodulate the signal if the modulated signal meets one or more defined limits establishing the specific codes. In one embodiment, the decoding apparatus 122 includes an integrator 222 which receives the modulated signal 132. The integrator generates an average DC voltage 224 proportional to the duty cycle of the modulated signal 132, where the duty cycle is proportional to the select voltage $V_{select}$ as discussed above. The integrator 222 couples with a decoder, and in one embodiment the decoder is a comparator 230. The comparator receives the average DC voltage 224. The comparator compares the average DC voltage 224 with one or more limits $V_{lim}$ to determine if the specific signature of the modulated signal 132 corresponds with the specific receiver code such that the receiver decodes the signal 132. If the average DC voltage 224 does not meet the limit or limits of the decoder 122, or is not within a predefined range dictated by the voltage limit (i.e., $V_{lim}+X$; $V_{lim}-X$), the decoder 122 does not decode the modulated signal 132.

In one embodiment, the comparator 230 is a window comparator having a first limit $V1_{lim}$ and a second limit $V2_{lim}$. If the average DC voltage 224 generated by the integrator 222 is not between the two limits $V1_{lim}$ and $V2_{lim}$, or equal to one of the limits, then the decoder 122 does not decode the modulated signal 132.

Figure 6:
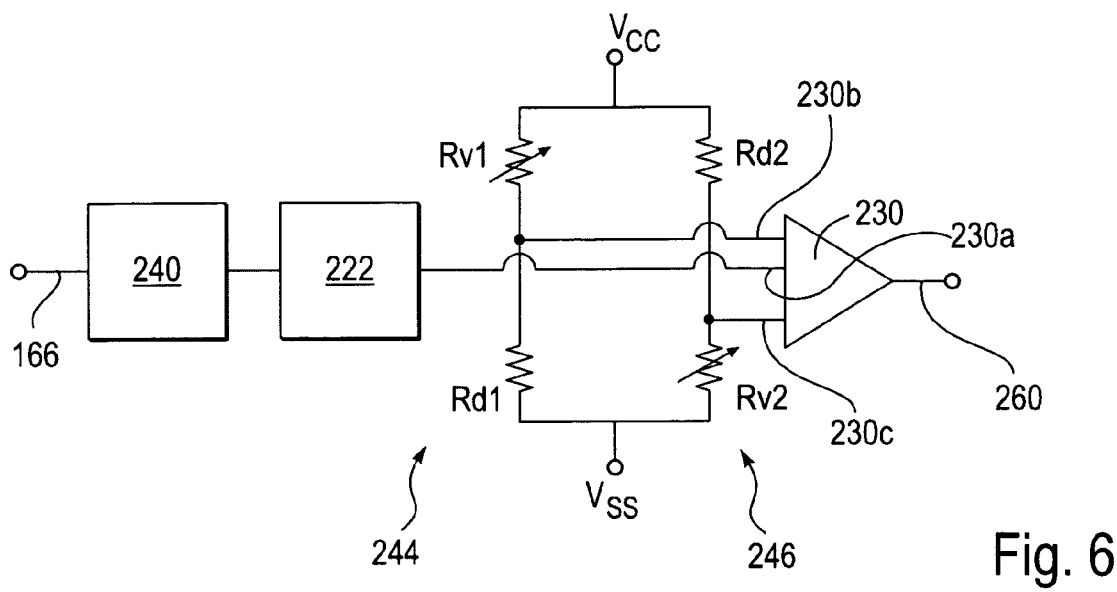
FIG. 6 depicts a simplified schematic diagram of one implementation of another embodiment of the decoder apparatus of the present invention.

FIG. 6 depicts a simplified schematic diagram of one implementation of one embodiment of the decoder apparatus 122 of the present invention. In one embodiment, the decoder 122 is part of a receiver having a receiver frequency demodulator or receiver mixer 240 to compensate or down convert for the frequency modulation of the transmitter 164. The output of the frequency demodulator 240 couples with the integrator 222. The integrator couples with a first input 230a of the window comparator 230. In one embodiment, a first voltage divider 244 couples with a second input 230b of the comparator and establishes an upper voltage limit $V1_{lim}$. A second voltage divider 246 couples with a third input 230c of the comparator to establish a lower voltage limit $V2_{lim}$. The first voltage divider 244 includes a first variable impedance element Rv1 coupled with a first reference voltage VCC and a first divider resistance element Rd1. The first divider resistance element Rd1 further couples with a second reference voltage VSS, where the upper limit $V1_{lim}$ is defined between the first variable impedance element and the first divider resistance element. The second voltage divider 246 includes a second divider resistance element Rd2 coupled with the first reference voltage VCC and a second variable impedance element Rv2. The second variable impedance element Rv2 further couples with the second reference voltage VSS, where the lower limit $V2_{lim}$ is defined between the second divider resistance element and the second variable impedance element. The window comparator 230 generates a decoded signal 260 which, in one embodiment, is at a first voltage level, for example in a high state, if the specific PWM duty cycle from the modulated signal 132 generates an average DC voltage which is between or equal to one of the upper and lower limits $V1_{lim}$ and $V2_{lim}$. In one embodiment, the first and second voltage dividers correspond with an encoder voltage divider 134 to ensure the decoder corresponds with the encoder and is authorized to decode the encoded signal or information.

Therefore, the apparatus of the present invention provides security to signals, data and/or information by encoding the signal through an encoder 120 with a specific code and decoding the information through a decoder 122 if the decoder verifies or matches the specific code.

Figure 7A:
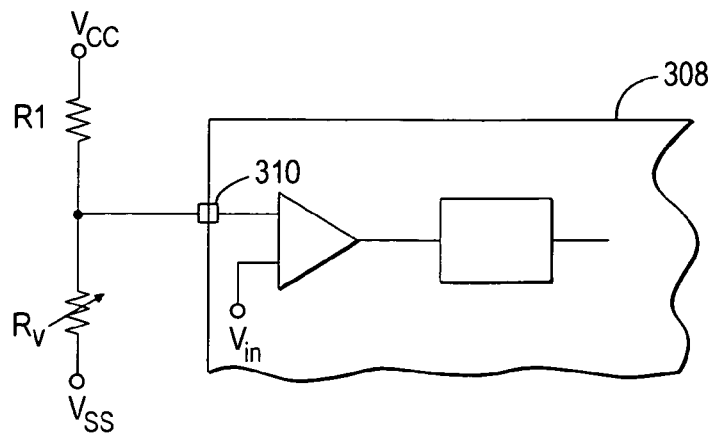
FIGS. 7A–B show simplified schematic diagrams of implementations of apparatus for encoding a reference or input signal, similar to those shown respectively in FIGS. 3 and 4, where the apparatus is generated on an integrated circuit (IC).
Figure 7B:
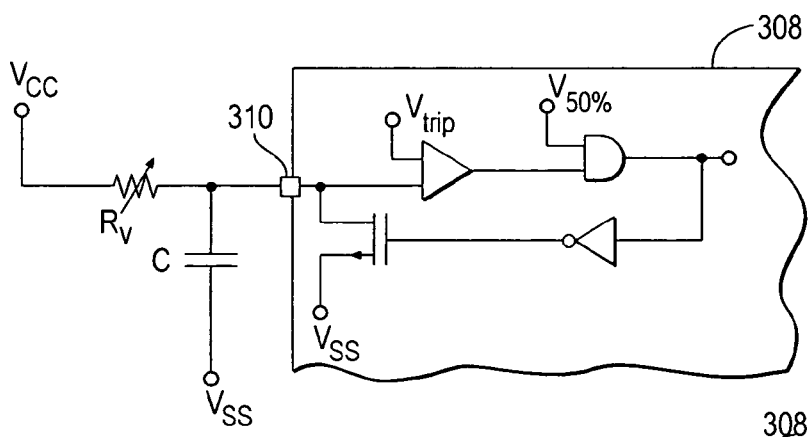
Figure 7C:
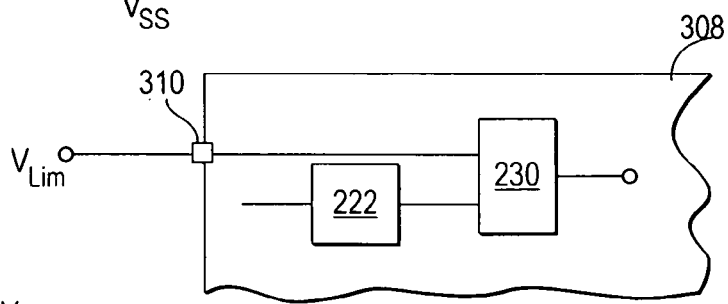
FIG. 7C shows a simplified schematic diagram of the apparatus for decoding an encoded signal, similar to that shown in FIG. 5, integrated on an IC and including one pin to allow variable circuitry to be implemented off the IC.
Figure 7D:
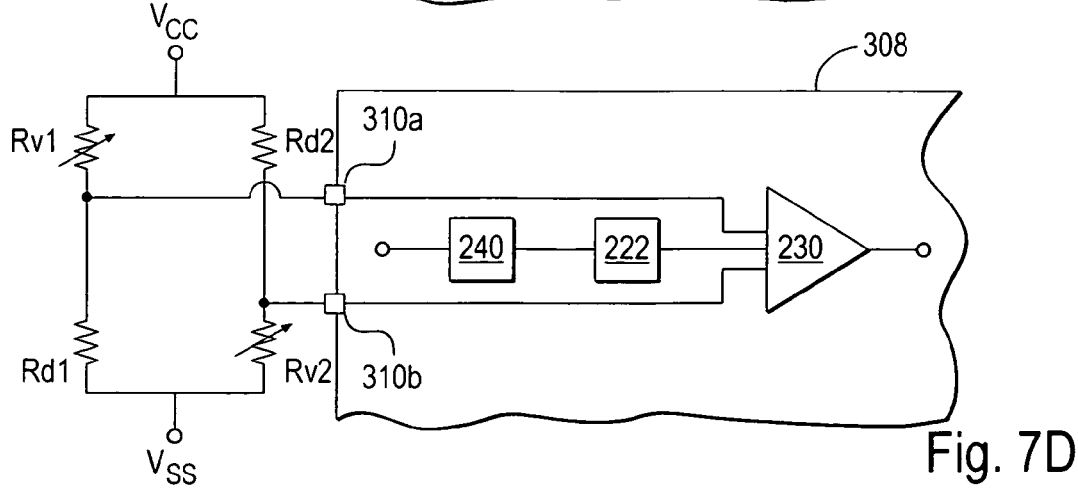
FIG. 7D shows a simplified schematic diagram of the apparatus for decoding a received encoded signal, similar to that shown in FIG. 6, where the apparatus is integrated on an IC.

In one embodiment, the encoding and/or decoding apparatuses 120, 122 of the present invention are implemented on one or more integrated circuits (IC), or integrated as part of a larger IC, and include a single pin to allow for the specific select voltage $V_{select}$ and/or the limit $V_{lim}$ to be set. FIGS. 7A–B show simplified schematic diagrams of implementations of encoders 120 similar to those shown in FIGS. 3 and 4, respectively, where the encoders are generated on an IC 308. The IC 308 includes a single pin 310 which allows the variable circuitry 312, including the voltage divider 134 or the RC network 178, to be implemented exterior to the IC 308. FIG. 7C shows a simplified schematic diagram of a decoder 122, similar to that shown in FIG. 5, implemented on an IC 308 including one pin 310 to allow the variable circuitry 314 to be implemented off the IC 308 to provide the decoder with limit $V_{lim}$. FIG. 7D shows a simplified schematic diagram of a decoder 122 similar to that shown in FIG. 6, where the decoder is integrated on an IC 308 including two pins 310a, 310b to allow the variable circuitry 314, including the first and second voltage dividers 244 and 246, to be implemented off the IC 308 and to provide the upper and lower limits $V1_{lim}$ and $V2_{lim}$. One of the advantages of implementing encoding and/or decoding through the use of external impedance elements (resistance element and/or capacitance element) is that a user is capable of modifying the specific code or signature of the encoded signal for their particular purpose.

Figure 8:
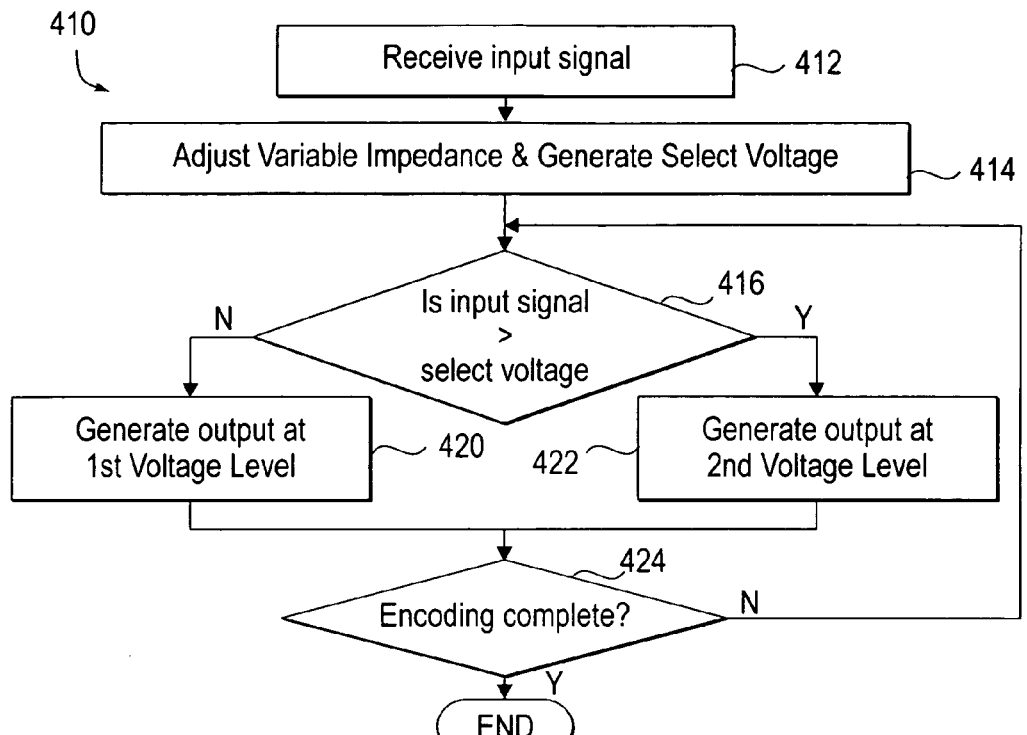
FIG. 8 depicts a flow diagram of one embodiment of a process for encoding a signal.

FIG. 8 depicts a flow diagram of one embodiment of a process 410 for encoding a signal. In step 412, the input signal is received. For example in referring to FIG. 3, the input signal is received in the second input 160b of the comparator 160. In step 414 a variable impedance element (i.e., Rv) is adjusted or set to generate a select voltage (i.e., $V_{sense}$). In step 416 it is determined whether the voltage of the input signal is equal to or greater than the select voltage. If the input signal is not equal to or greater than the select voltage, step 420 is entered where an output signal is generated at a first voltage level, for example a high voltage level. If, in step 416, it is determined that the voltage of the input signal is equal to or greater than the select voltage, step 422 is entered such that the output signal is generated at a second voltage level, for example a low voltage level. Following steps 420 and 422, decision step 424 is entered where it is determined if the encoding is complete. If the encoding is complete, the process 410 ends. If the encoding is not complete, the process returns to decision step 416 to continue to compare the input signal with the select voltage.

Figure 9:
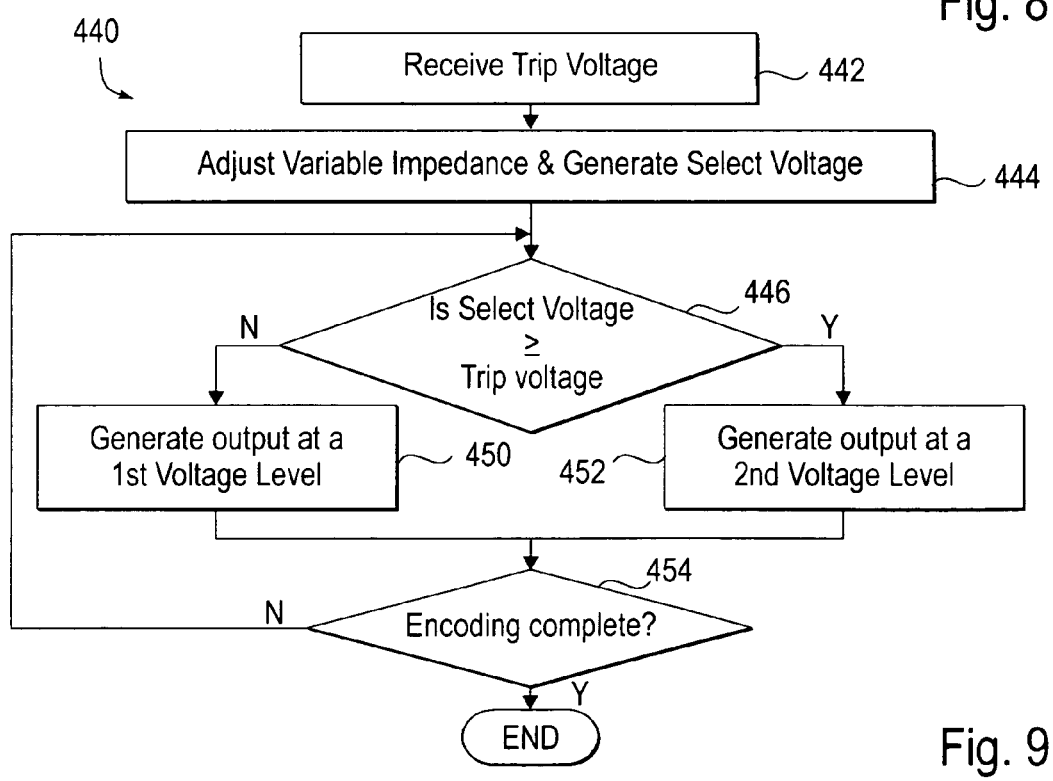
FIG. 9 shows a flow diagram of another embodiment of a process for encoding a signal.

FIG. 9 shows a flow diagram of one embodiment of a process 440 for encoding a signal. In step 442, a trip voltage is received. For example referring to FIG. 4, $V_{trip}$ is received at the second input 180*b* of the comparator 180. In step 444 a variable impedance element (i.e., Rv) is adjusted such that a select voltage is generated where the voltage of the select voltage ramps up over time dictated by the impedance level of the variable impedance element. In step 446 it is determined whether the select voltage is equal to or greater than the trip voltage. If the select voltage is not equal to or greater than the trip voltage, step 450 is entered where an output signal is generated at a first voltage level, for example, a high voltage level. If, in step 446 it is determined that the select voltage is equal to or greater than the trip voltage, step 452 is entered where the output signal is generated at a second voltage level, for example a low voltage level. Following steps 450 and 452, decision step 454 is entered where it is determined if the encoding is complete. If the encoding is complete, the process 440 ends. If the encoding is not complete, the process returns to decision step 446 to continue comparing the select voltage with the trip voltage.

Figure 10:
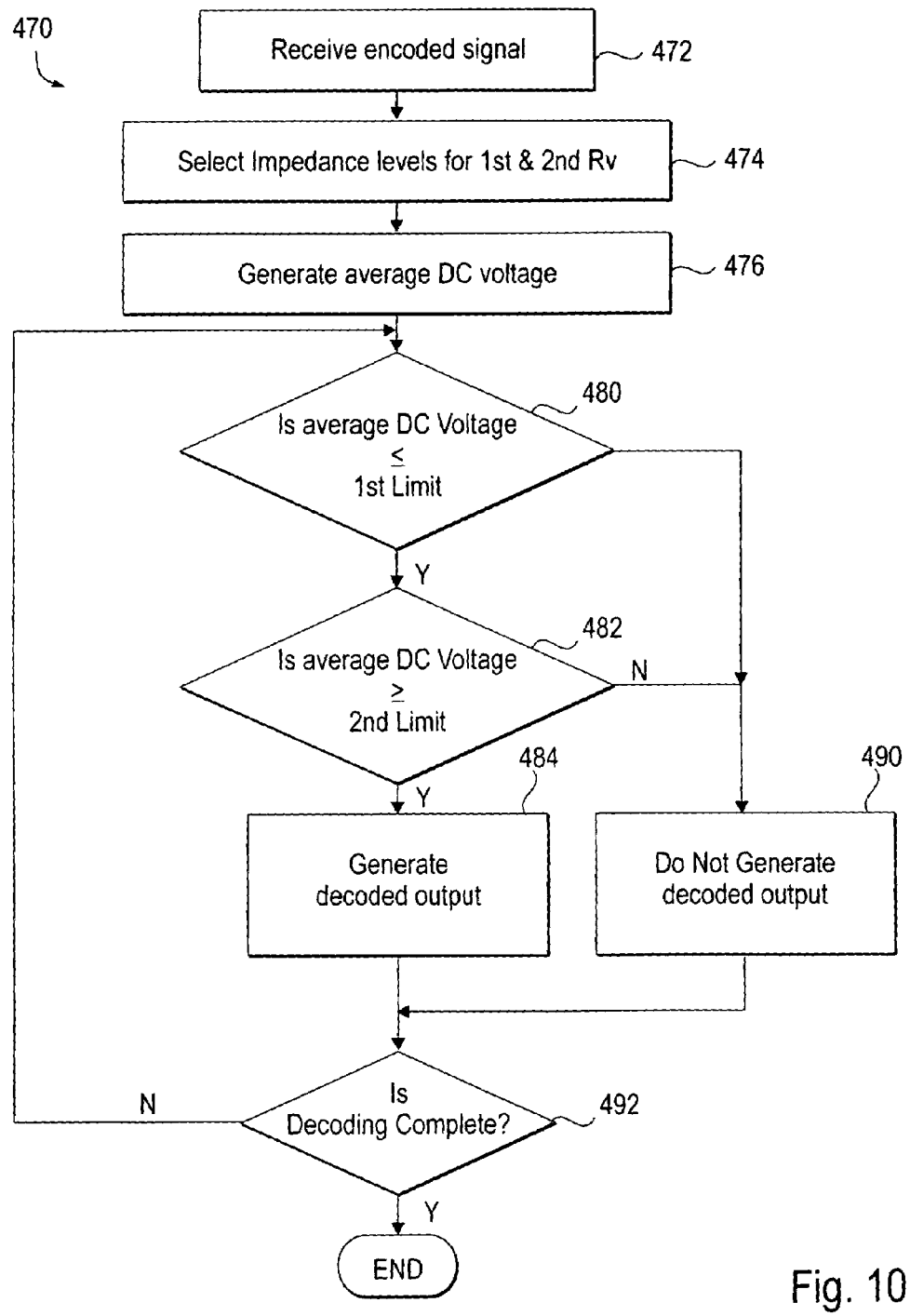
FIG. 10 depicts a flow diagram of a process for decoding an encoded input signal.

FIG. 10 depicts a flow diagram of a process 470 for decoding an encoded input signal. In step 472, the encoded signal is received. For example, referring to FIG. 6, the encoded signal 166 is received by the demodulator 240. In step 474, impedance levels of a first variable impedance element (i.e., Rv1) and a second variable impedance element (i.e., Rv2) are selected such that a first voltage limit and a second voltage limit are generated as dictated by the impedance levels of the first and second variable impedance elements. In step 476, an average DC voltage is generated proportional to the encoded signal. In one embodiment, the average DC voltage is proportional to a duty cycle of the encoded signal. In one embodiment, the average DC voltage is generated through an integration of the encoded signal. In decision step 480, it is determined whether the average DC voltage is equal to or less than the first voltage limit (for example, the first voltage limit established by the first voltage divider 244). If the average DC voltage is equal to or less than the first voltage limit, then decision step 482 is entered where the average DC voltage is compared with the second voltage limit (for example, the voltage limit established by the second voltage divider 246) to determine if the average DC voltage is equal to or greater than the second voltage limit. If the average DC voltage is greater than the second voltage limit, the process 470 enters step 484 where a decoded output signal is generated. If, in steps 480, it is determined that the average DC voltage is greater than the first voltage limit, or in step 482 that the average DC voltage is less than the second voltage limit, then step 490 is entered where the decoded output signal is not generated. Following steps 484 and 490, decision step 492 is entered to determine if decoding is complete. If decoding is complete the process 470 ends. If decoding is not complete, the process returns to step 480 to continue to compare the average DC voltage with the voltage limits.

The present invention is capable of being utilized in substantially an unlimited number of devices. A few examples of the implementation of the present invention include, but are not limited to: a garage door opener and accompanying remote access device to signal the opening and closing of the garage door; a security or alarm system and a remote access device to activate and deactivate the security system (the apparatus is equally applicable to security systems for cars, homes, businesses, etc.); and two-way communication devices where each device includes both an encoder with a transmitter and a decoder with a receiver, in one embodiment, the users are capable of selecting the specific code.

The number of potential users or windows of detection are limited only by the sensitivity and errors within the system. Thus, the more accurate the system utilized to implement the encoder and/or decoders, the more narrow the decoder windows, defined by the upper and lower voltage limits $V1_{lim}$ and $V2_{lim}$, that can be use, resulting in an increased number of users. Further, the apparatus and method of the present invention is not limited by the frequency of the input signal (triangle wave, sine wave, etc.).

As can be seen from the foregoing, the present invention provides an apparatus and method for a simplified encoding and decoding. In one embodiment, the present invention is implemented through a single pin design allowing users to define the encoded signature. Further, the present invention is capable of being used to increase the size of the encoded signal or word by utilizing similar external impedance networks with any number of pins, thereby allowing more code selections. In this regard, multiple states can be processed with the invention by adding more pins. For example, two pins provide four states. These states can be represented by different PWM periods on the encoder, and varied analog direct current levels on the decoder.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An encoding apparatus for use with an input signal, comprising:
   an encoder having first and second inputs, the encoder including a comparator having an output and a logic gate having first and second inputs, the output of the comparator being coupled with the first input of the logic gate and a periodic signal being supplied to the second input of the logic gate; and
   a variable impedance element for establishing a select voltage, the first input of the encoder being coupled to the variable impedance element to receive the select voltage, the second input of the encoder adapted to receive the input signal, the encoder modulating the input signal to generate an output signal as a function of the select voltage, the output signal being output by the logic gate.

2. The encoding apparatus as claimed in claim 1, further comprising a voltage divider coupled with the encoder, the voltage divider including the variable impedance element and at least partially defining the select voltage.

3. The encoding apparatus as claimed in claim 2, wherein the voltage divider is coupled with the first input of the comparator such that the first input of the comparator receives the select voltage, the second input of the comparator adapted to receive the input signal.

4. The encoding apparatus as claimed in claim 1, further comprising an integrated circuit, the encoder being formed on the integrated circuit and being coupled with a pin of the integrated circuit and the variable impedance element being separate from the integrated circuit and being coupled with the pin to supply the select voltage to the encoder through the pin.

5. The encoding apparatus as claimed in claim 1, further comprising a capacitor coupled with the variable impedance device such that the first input of the encoder is also coupled to the capacitor and the select voltage is defined between the variable impedance device and the capacitor, the select voltage changing with time at a rate defined by an RC constant associated with the capacitor and the variable impedance device.

6. The encoding apparatus as claimed in claim 5, further comprising:
a switch coupled with an output of the encoder to receive the output signal such that the output signal activates and deactivates the switch;
the switch being further coupled with the capacitor such that when the switch is activated the capacitor is discharged.

7. The encoding apparatus as claimed in claim 5, further comprising:
an inverter coupled to the logic gate to invert the output signal.

8. The encoding apparatus as claimed in claim 5, further comprising an integrated circuit, the encoder being formed on the integrated circuit and being coupled with a pin of the integrated circuit and the variable impedance element and the capacitor being separate from the integrated circuit and being coupled with the pin to supply the select voltage to the encoder through the pin.

9. The encoding apparatus as claimed in claim 1 wherein the variable impedance device is a resistor.

10. A method for encoding an input signal with a circuit comprising the steps of establishing a select voltage using a variable impedance element, providing the select voltage to an encoder having a first input coupled to the variable impedance element for receiving the select voltage, a second input for receiving the input signal, a comparator for receiving the first and second inputs and having an output, and a logic gate having first and second inputs, the output of the comparator being coupled with the first input of the logic gate and a periodic signal being supplied to the second input of the logic gate, and modulating the input signal to generate a modulated signal that is a function of the select voltage, whereby the logic gate outputs the output signal.

11. The method as claimed in claim 10, wherein the establishing step includes setting the impedance of the variable impedance element, the select voltage being dependent upon the impedance of the variable impedance element.

12. The method of claim 10, wherein the variable impedance element is coupled with a capacitor between a first reference voltage and a second reference voltage, and wherein the select voltage is output from a circuit node between the capacitor and the variable impedance element, the method further comprising ramping the select voltage after it is discharged.

\* \* \* \* \*